United States Patent
Herring

(10) Patent No.: US 10,546,479 B2
(45) Date of Patent: Jan. 28, 2020

(54) VEHICLE MOUNTED H2S MONITORING SYSTEM

(71) Applicant: Frontline Detection, LLC, Spring Branch, TX (US)

(72) Inventor: Michael Ezequiel Herring, San Antonio, TX (US)

(73) Assignee: FRONTLINE DETECTION, LLC, Spring Branch, TX (US)

( * ) Notice: Subject to any disclaimer, the term of this patent is extended or adjusted under 35 U.S.C. 154(b) by 0 days.

(21) Appl. No.: 15/906,324

(22) Filed: Feb. 27, 2018

(65) Prior Publication Data
US 2019/0266875 A1    Aug. 29, 2019

(51) Int. Cl.
*G08B 21/14*    (2006.01)
*B60Q 9/00*    (2006.01)

(52) U.S. Cl.
CPC ............... *G08B 21/14* (2013.01); *B60Q 9/00* (2013.01)

(58) Field of Classification Search
CPC .................................... E21B 1/00; G01N 1/00
See application file for complete search history.

(56) References Cited

U.S. PATENT DOCUMENTS

| | | | |
|---|---|---|---|
| 2010/0063652 A1* | 3/2010 | Anderson | A61B 5/02055 701/2 |
| 2012/0188074 A1* | 7/2012 | Williams | G06Q 50/06 340/539.13 |
| 2017/0076511 A1* | 3/2017 | Busch-Sorensen | G07C 5/008 |
| 2017/0365151 A1* | 12/2017 | Burleson | G08B 21/14 |

OTHER PUBLICATIONS

International Search Report and Written Opinion from related PCT Application No. PCT/US2019/019869, dated Apr. 8, 2019, 9 pages.

* cited by examiner

*Primary Examiner* — Shirley Lu
(74) *Attorney, Agent, or Firm* — Law Office of Jeff Williams PLLC; J. Oliver Williams

(57) ABSTRACT

A vehicle mounted H2S monitoring system is shown having a first sensor, a control module, a second sensor, and a vehicle. The first sensors are coupled to exterior locations on the vehicle and monitor air quality prior to a worker within the vehicle exiting. Second sensors are coupled to a portion of the worker and travel with that worker outside the vehicle. Both sets of sensors monitor environmental conditions for safety of the workers. The control module processes readings received from the sensors to assess environmental conditions and may automatically activate or broadcast an alert in real time to show the safety of the current levels. Alerts may be transmitted to a remote location for oversight.

15 Claims, 3 Drawing Sheets

VEHICLE MOUNTED H2S MONITORING SYSTEM

BACKGROUND

1. Field of the Invention

The present application relates to a monitor for the detection of hydrogen sulfide (H2S) in the environment, and more particularly to a vehicle mounted monitoring system for detection and warning prior to exposure from the harmful gas.

2. Description of Related Art

Hydrogen Sulfide (H2S) is a gas commonly found during the drilling and production of crude oil and natural gas. It is also found in wastewater treatment, utility facilities, and sewers. The gas is produced as a result of the breakdown of organic materials in the absence of oxygen. The gas is colorless, flammable, poisonous and corrosive. H2S has a toxicity similar to carbon monoxide and prevents cellular respiration. Exposure to H2S could lead to death and serious health injuries.

Gas is a silent threat, often invisible to the body's senses. Inhalation is the primary route of exposure to hydrogen sulfide. H2S gas is traditionally noticeable by its rotten egg smell. Though it may be easily smelled by some people at small concentrations, continuous exposure to even low levels of H2S quickly deadens the sense of smell (olfactory desensitization). Exposure to high levels of the gas can deaden the sense of smell instantly. Although the scent of H2S is a characteristic, smell is not a dependable indicator of H2S gas presence or for indicating increasing concentrations of the gas. Proper monitoring and detection could mean the difference between life and death.

H2S irritates the mucous membranes of the body and the respiratory tract, among other things. Following exposure, short-term, or acute, symptoms may include a headache, nausea, convulsions, and eye and skin irritation. Injury to the central nervous system can be immediate and serious after exposure. At high concentrations, only a few breaths are needed to induce unconsciousness, coma, respiratory paralysis, seizures, and even death.

Those having prolonged exposure to high enough levels of H2S gas to cause unconsciousness may continue to experience headaches, reduced attention span and reduced motor functions. Pulmonary effects of H2S gas exposure may not be apparent for up to 72 hours following removal from the affected environment. Delayed pulmonary edema, a buildup of excess fluid in the lungs, may also occur following exposure to high concentrations.

H2S does not accumulate in the body, but repeated/prolonged exposure to moderate levels can cause low blood pressure, headache, loss of appetite and weight loss. Prolonged exposure to low levels may cause painful skin rashes and irritated eyes. Repeated exposure over time to high levels of H2S may cause convulsions, coma, brain and heart damage, even death.

Hydrogen sulfide is a fast acting poison, impacting many systems within the body. In an attempt to detect H2S in an environment, workers use wearable gas sensors. These sensors compensate for the inability of the body's senses to adequately detect the presence and levels of H2S. As noted, these sensors are placed upon the worker to provide a notification to the worker about the H2S content in the environment. If levels are detected, a notification is issued to the worker and the workers leave the area.

A problem with current sensors is that they provide detection for only the environment to which the worker is presently in. As long as a worker remains within an enclosed vehicle, for example, he/she would not know about the H2S levels in the environment outside. As noted previously, H2S is a fast acting poison on the body. If the levels of H2S were determinable from within the vehicle, workers would be spared small exposure as they exited. Another issue at play is that the body sensor is susceptible to limitations due to wind direction and speed. If the worker is situated in selected ways or positioned relative to the wind in a particular manner, the body sensor may not detect the H2S.

Although strides have been made to provide proper detection for workers in H2S environments, shortcomings remain. It is desired that a system be used that provides for an initial level of detection for the workers outside the vehicle prior to worker exposure in the environment.

SUMMARY OF THE INVENTION

It is an object of the present application to provide a vehicle mounted H2S sensor system that works together with wearable sensors to provide H2S detection in an environment prior to initial exposure of the worker to the environment. The system uses multiple sensors located in exterior locations on a vehicle. A control module is used to process the readings from the sensors and provide an indication to the workers about the levels of H2S outside the vehicle.

It is a further object of the present application to utilize the sensors on the vehicle as an additional remote monitoring station while the workers are performing their tasks. Communication occurs between the vehicle based sensor system and the wearable sensors on each worker.

Another object of the present application is to permit the sensor system to transmit readings to a remote location for monitoring by an individual/machine outside and distant from the work area. This allows selected actions to be taken quickly based upon conditions in the work area and the workers (i.e. send emergency personnel).

Ultimately the invention may take many embodiments but features the ability to create safety first and foremost, provide mobility for quick setup and takedown, have the ability to be setup in limited space, and provide versatility for all with a recreational vehicle to enjoy speedway events with the best view possible. In this way, this assembly overcomes the disadvantages inherent in the prior art.

The more important features of the system have thus been outlined in order that the more detailed description that follows may be better understood and to ensure that the present contribution to the art is appreciated. Additional features of the system will be described hereinafter and will form the subject matter of the claims that follow.

Many objects of the present system will appear from the following description and appended claims, reference being made to the accompanying drawings forming a part of this specification wherein like reference characters designate corresponding parts in the several views.

Before explaining at least one embodiment of the system in detail, it is to be understood that the system is not limited in its application to the details of construction and the arrangements of the components set forth in the following description or illustrated in the drawings. The system is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present system. It is important, therefore, that the claims be regarded as including such equivalent constructions insofar as they do not depart from the spirit and scope of the present system.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
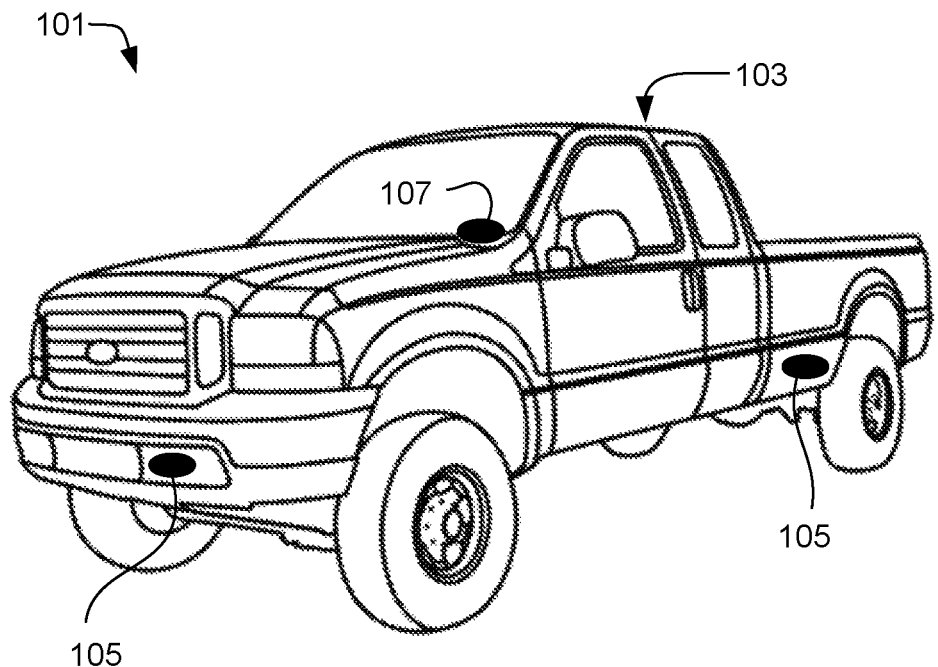
FIG. 1 is a perspective view of a vehicle mounted H2S monitoring system according to an embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the system described herein may be oriented in any desired direction.

The system and method in accordance with the present application overcomes one or more of the above-discussed problems commonly associated with elevated platforms discussed previously. In particular, the system is configured to monitor environmental conditions for the presence of selected harmful gases or elements prior to exposure of workers entering the environment. The system syncs a vehicle mounted system with both a remote location monitoring center and a wearable sensor on each worker. These and other unique features of the system are discussed below and illustrated in the accompanying drawings.

The system and method will be understood, both as to its structure and operation, from the accompanying drawings, taken in conjunction with the accompanying description. Several embodiments of the system may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The system and method of the present application is illustrated in the associated drawings. The vehicle mounted H2S monitoring system of the present application includes a vehicle, a first sensor coupled to an exterior of the vehicle, a control module within the vehicle, and a second sensor coupled to a worker and transportable away from the vehicle. The sensors convey a signal sensor to the control module related to a level of harmful substances detected in the air. The system provides detection and notification to the workers both prior to exiting the vehicle and after they have exited the vehicle. Notification may be transmitted to both one or more workers linked to the control module and to a third party remote location for appropriate action. Additional features and functions of the device are illustrated and discussed below.

Referring now to the Figures wherein like reference characters identify corresponding or similar elements in form and function throughout the several views. The following Figures describe the vehicle mounted H2S monitoring system of the present application and its associated features. With reference now to the Figures, an embodiment of the modular observation assembly and method of use are herein described. It should be noted that the articles "a", "an", and "the", as used in this specification, include plural referents unless the content clearly dictates otherwise.

Figure 2:
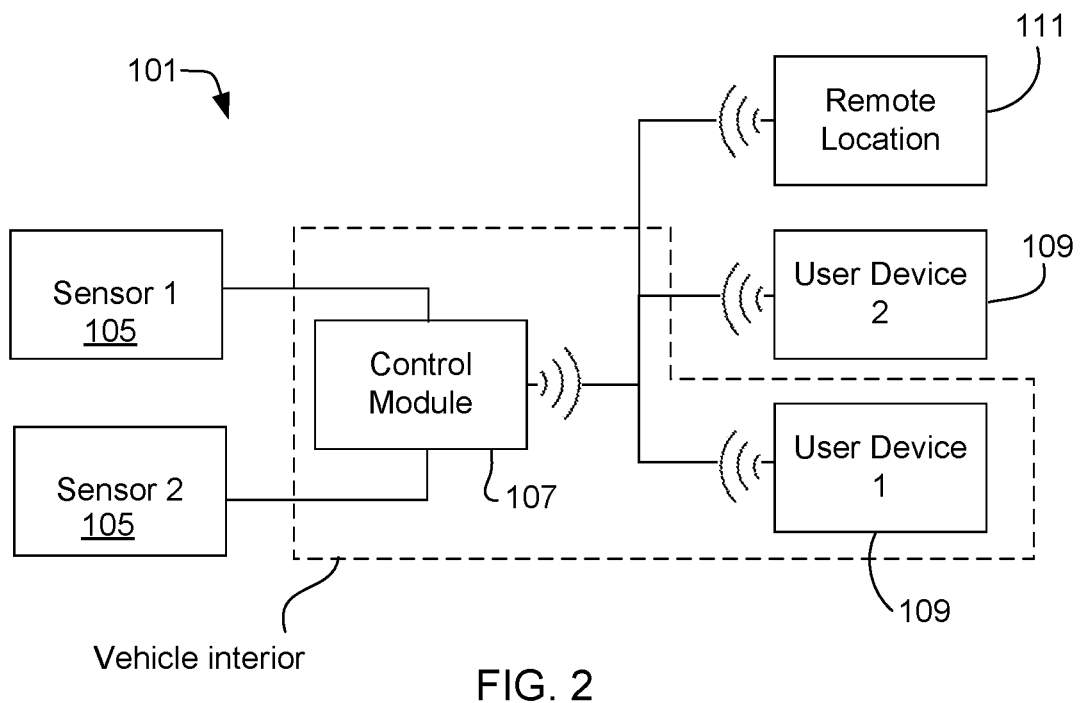
FIG. 2 is a schematic of the vehicle mounted H2S monitoring system of FIG. 1.

Referring now to FIGS. 1 and 2 in the drawings, a vehicle mounted H2S monitoring system 101 is illustrated. System 101 includes a vehicle 103, a first sensor 105, a control module 107, and a second sensor 109. Vehicle 103 is configured to transport one or more workers into and out of an environment. Vehicle 103 can be of various different types, such as a truck, a van, a tractor, and so forth. It is generally thought that vehicle 103 includes an interior portion that is isolated from the general environment. Workers ride predominantly in the interior. Doing so, as they enter a new environment, no indication is provided to the safety of the environment without first sensor 105.

First sensor 105 is configured to detect the presence of a harmful substance in the environment. Sensor 105 is coupled to an exterior portion of vehicle 103 so as to have access to the air within the environment. Sensor 105 takes readings and monitors the levels of harmful substances in the air and sends a sensor signal to control module 107. The sensor signals may be sent continuously, intermittently at a predetermined time delay, or as needed. Considering the safety of the workers and the harmful nature of H2S, it is preferred that it continuously monitors and sends sensor signals to control module 107.

Control module 107 receives the signal sensor from first sensor 105 prior to workers leaving vehicle 103. This may be done as the vehicle is arriving or entering an environment. A worker may engage a user interface 20 (see FIG. 3) on module 107 to turn on or off any of the sensors or portions of system 101. While the vehicle 103 is in the environment and prior to workers exiting, system 101 uses sensors 105 to assess the air quality. If H2S levels are too high, a notification is provided to the workers to alert them. They can then avoid going outside when conditions are not suitable. Or the workers can be properly suited up prior to exiting the vehicle 103 by having masks on. This is useful to avoid any exposure from inhalation of contaminated air.

Control module 107 is in electrical communication with sensors 105 and sensors 109. Communication may occur through either wireless and/or wired methods. Control module 107 processes the signals it receives from each sensor 105 and 109 and analyzes them so as to assess if they are in acceptable levels. The acceptable level of harmful substances are predetermined and set within system 101. System 101 is permitted to allow workers the ability to engage module 107 through one or more interfaces and adjust performance characteristics and functions therein. One or more safe guards may be installed on module 107 to prevent workers from accidentally modifying a parameter in a detrimental way.

Second sensor 109 is similar in form and function to that of first sensor 105. Sensor 109 is portable or transportable to locations outsides of vehicle 103. Sensors 105 are typically worn by workers while they perform their duties. Each sensor 109 provides location specific monitoring capabilities adjacent the worker. Sensor 109 is communicable with module 107 and transmits secondary sensor signals similar to the sensor signals of sensor 105. Module 107 is configured to analyze all signals in real time and take necessary steps to protect the safety of workers. It is important to note that sensors 109 are wearable and are therefore not suitable for monitoring the air quality outside the vehicle 103 while the worker is located inside. The usefulness of sensor 109 is seen as workers travel around the environment away from vehicle 103.

Although shown in FIG. 2 as having control module 107 being coupled to an interior portion of vehicle 103, it is understood that control module 107 may be incorporated into any of sensors 105 or 109. It is preferred that module 107 be accessible to a worker. Therefore, module 107 may be coupled to a worker and also may be incorporated into, or combined within, sensor 109/105. Additionally, as seen in FIG. 2, the user devices/sensors 109 are shown as being either internal or external to the interior of vehicle 103. This is to help illustrate the mobility of such devices when worn by a worker, the worker moving between the interior and the exterior.

Figure 3:
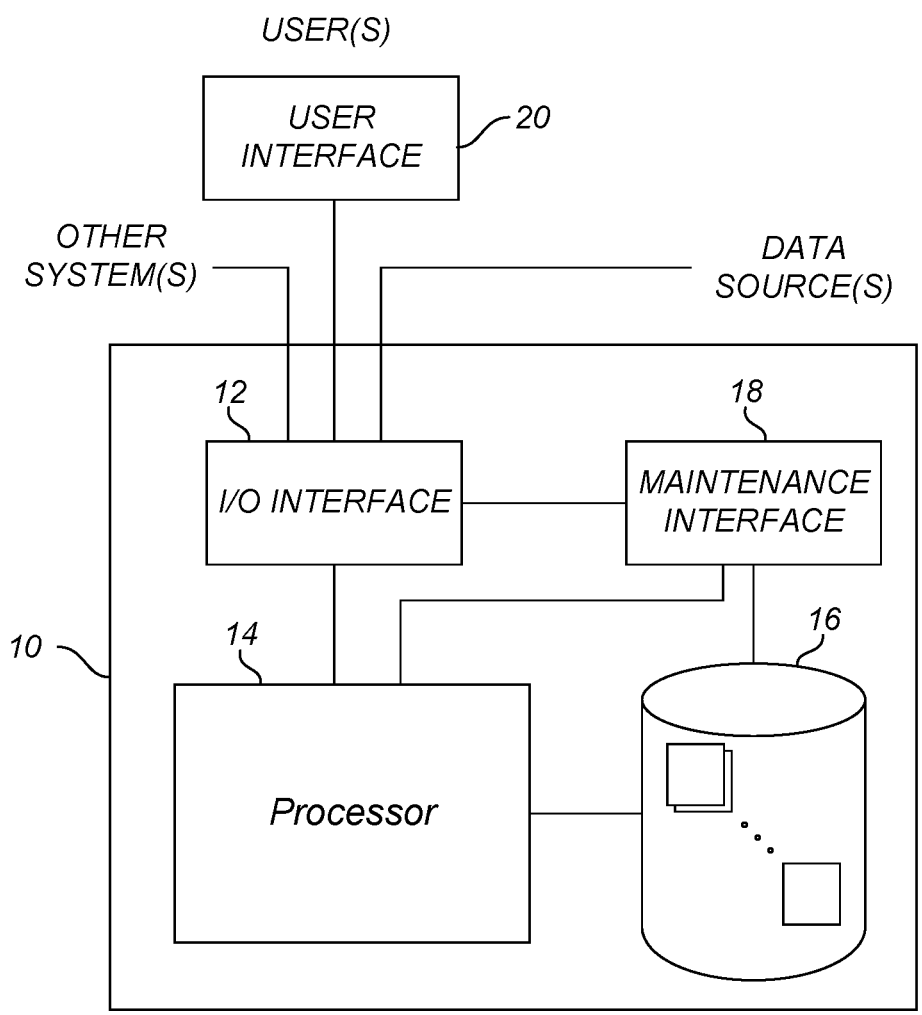
FIG. 3 is an exemplary diagram of a control module and sensors in the vehicle mounted H2S monitoring system of FIG. 2.

Referring now also to FIG. 3 in the drawings, a schematic of exemplary electronic devices used in system 101 are illustrated. System 101 includes one or more electronic devices that work together in a coordinated manner to facilitate the safe monitoring of a worker's environment. System 101 may include one or more electronic devices to perform the selected tasks and functions described herein. Each electronic device may include multiple types of hardware components and software to facilitate proper communication. Exemplary electronic device 10 can be used to describe the functions, features, and limitations of module 107, sensor 105, sensor 109, and devices used at remote location 111.

In FIG. 3 is an exemplary electronic device used in system 101. FIG. 2 illustrates an exemplary electronic device 10 for monitoring and regulating system 101. The electronic device 10 includes an input/output (I/O) interface 12, a processor 14, a database 16, and a maintenance interface 18. Alternative embodiments can combine or distribute the input/output (I/O) interface 12, processor 14, database 16, and maintenance interface 18 as desired. Embodiments of the electronic device 10 can include one or more computers that include one or more processors and memories configured for performing tasks described herein below. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers includes a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks. Furthermore, the computers may use transitory and non-transitory forms of computer-readable media. Non-transitory computer-readable media is to be interpreted to comprise all computer-readable media, with the sole exception of being a transitory, propagating signal.

The I/O interface 12 provides a communication link between external users, systems, and data sources and components of the electronic device 10. The I/O interface 12 can be configured for allowing one or more users to input information to the electronic device 10 via any known input device, such as user interface 20 for example. Examples can include a keyboard, mouse, touch screen, microphone, and/or any other desired input device. The I/O interface 12 can be configured for allowing one or more users to receive information output from the electronic device 10 via any known output device. Examples can include a display monitor, a printer, a speaker, and/or any other desired output device or method. The I/O interface 12 can be configured for allowing other systems to communicate with the electronic device 10. For example, the I/O interface 12 can allow one or more remote computer(s) to access information, input information, and/or remotely instruct the electronic device 10 to perform one or more of the tasks described herein. The I/O interface 12 can be configured for allowing communication with one or more remote data sources. For example, the I/O interface 12 can allow one or more remote data source(s) to access information, input information, and/or remotely instruct the electronic device 10 to perform one or more of the tasks described herein.

The database 16 provides persistent data storage for electronic device 10. While the term "database" is primarily used, a memory or other suitable data storage arrangement may provide the functionality of the database 16. In alternative embodiments, the database 16 can be integral to or separate from the electronic device 10 and can operate on one or more computers. The database 16 preferably provides non-volatile data storage for any information suitable to support the operation of the electronic device 10, including various types of data discussed herein.

The maintenance interface 18 is configured to allow users to maintain desired operation of the electronic device 10. In some embodiments, the maintenance interface 18 can be configured to allow for reviewing and/or revising the data stored in the database 16 and/or performing any suitable administrative tasks commonly associated with database management. This can include, for example, updating database management software, revising security settings, and/or performing data backup operations. In some embodiments, the maintenance interface 18 can be configured to allow for maintenance of the processor 14 and/or the I/O interface 12. This can include, for example, software updates and/or administrative tasks such as security management and/or adjustment of certain tolerance settings.

The processor 14 is configured for regulating the interaction of the various components within electronic device 10. The processor 14 may process, capture, and validate information within the system automatically and perform selected tasks with respect to comparing sensor signal readings, regulating the operation of one or more notifications, transmitting data and so forth. The processor 14 is configured to regulate and handle the operation of electronic device 10. The processor 14 can include various combinations of one or more processors, memories, and software components.

It is understood that system 101 may include one or more software programs loaded onto and executable through any of the electronic devices within the system 101.

Figure 4:
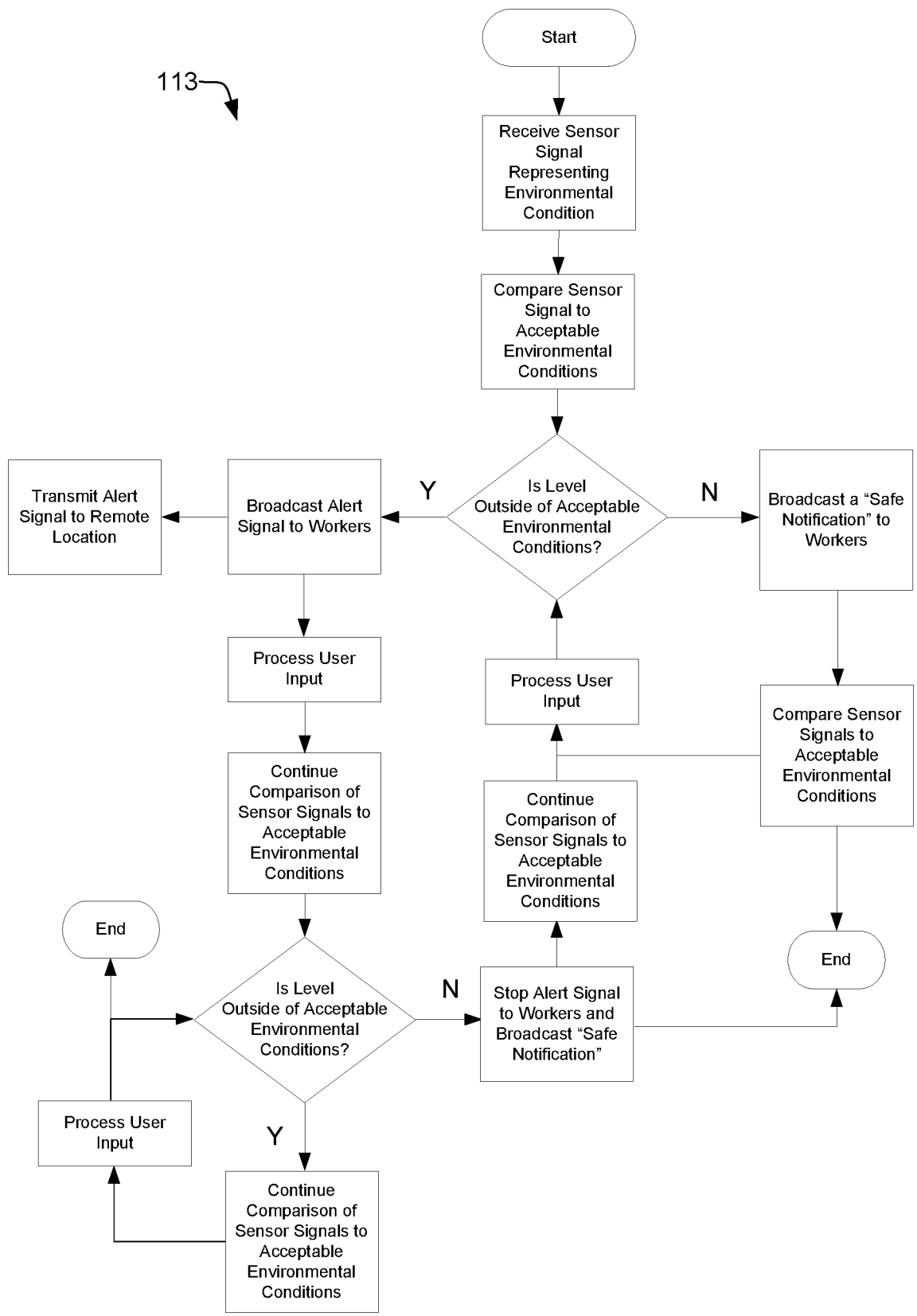
FIG. 4 is a flowchart of the vehicle mounted H2S monitoring system of FIG. 1.

Referring now also to FIG. 4 in the drawings, a flowchart 113 of system 101 is illustrated. System 101 is configured to be turned on or off via module 107 and any associated interface. Use of module 107 and sensors 105 may be imbedded within the software of vehicle 103 or be an "add on" set of equipment. In use while the vehicle 103 is driving at a job site in the environment of interest or while it is sitting idle with workers inside, system 101 may be operational and monitoring the air quality of the environment. Sensors 105 gather information and readings and transmit those signal readings to module 107 for analysis and processing. Module 107 compares the levels of H2S with acceptable levels and determines if the levels received are outside those acceptable levels. If the levels are too high (i.e. outside acceptable levels), a notification/alert signal is broadcast to the workers within the vehicle prior to exiting.

This notification may be accomplished through visual means (i.e. lights or textual data) or audible means (i.e. speaker noise). The notification may be regulated in a couple different manners. The notification may persist until the levels are acceptable. In another embodiment, the notification may be a mix of signals. For example, initially there may be a sound emitted in combination with a light, but the light persists once the notification is acknowledged by the worker. It is understood that there are numerous ways to handle notifications and their persistence. Ultimately a notification is given. Optionally a user input may be provided in response through an interface. This interface may be used to permit functional control of module 107 and system 101 in general. Once the notification or alert signal has been triggered, sensors 105 continue to monitor the air quality. System 101 continues to assess air quality and if the levels drop to acceptable levels then module 107 may cease the notification alert signal.

Workers exit vehicle 103 when it is either safe, such that the harmful substances are within acceptable levels, or when the workers are adequately equipped (i.e. masks). When workers exit the vehicle 103, they carry sensors 109. Sensors 109 act similarly to that of sensors 105. Sensors 109 and sensors 105 can operate simultaneously at the job site. Module 107 can receive sensor signals from both sets of sensors. If the harmful substances are within acceptable levels, module 107 may be configured to broadcast a "safe notification" through module 107 or through sensor 109. The notifications act as an instantaneous measure of the air quality. At any point, workers may access interface 20 to input or receive data.

As seen further in FIG. 4 is the ability of module 107 to transmit an alert signal to a remote location. A remote location may refer to a control center or operation center off-site which is used to monitor the activity of the workers and/or equipment at the site. System 101 is configured to optionally include one or more remote electronic devices 111 at a remote location. Module 107 can automatically communicate to devices 111 about the present air quality condition experienced by the workers.

It should be understood that the entire system may be turned on/off or permit for the selective shutdown of some sensors. There is no limitation to the number of vehicle sensors 105 and worker sensors 109 that may be linked through module 107. Additionally, system 101 is describe in relation to H2S, but any other type of gas may be monitored. Any liquid, solid, or gaseous substance may be monitored through system 101.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A hydrogen sulfide gas monitoring system, comprising:
    an enclosed vehicle configured to transport workers within the vehicle into an out of selected environments;
    a first sensor exposed to an environment and coupled to an exterior portion of the vehicle, the first sensor configured to detect a harmful substance in the environment;
    a control module integrated into the enclosed vehicle and in electrical communication with the first sensor to process a sensor signal from the first sensor corresponding to levels of the harmful substance detected in the environment external to the vehicle;

a second sensor detached from the vehicle and wearable by a worker, the second sensor configured to detect the harmful substance in the environment as the worker is external to the vehicle, the second sensor configured to transition between an interior location within the vehicle and an exterior location outside the vehicle, the outside location being within the environment, the second sensor in communication with the control module, the first sensor and the second sensor being optionally within the same environment;

wherein the first sensor is configured to detect the harmful substance prior to exposure of the second sensor outside the vehicle, the control module configured to broadcast a notification regarding the safety condition in the environment as a result of data from either of the first sensor and the second sensor; and wherein each of the first sensor and second sensor includes a separate user interface for regulating functional control of the control module and the control module includes a user interface to provide functional control of the first sensor and the second sensor.

2. The system of claim 1, wherein the control module is coupled to the vehicle.

3. The system of claim 1, wherein the control module is coupled to a worker.

4. The system of claim 3, wherein the control module is combined with the second sensor in a single body.

5. The system of claim 1, wherein the control module is configured to broadcast an alert signal through an output interface when the level of the harmful substance is higher than an acceptable level.

6. The system of claim 1, wherein the control module is configured to broadcast a safe notification through an output interface when the level of the harmful substance is within an acceptable level as detected from at least one of the first sensor and the second sensor.

7. The system of claim 1, further comprising:

a remote electronic device at a remote location from the vehicle and the second sensor, the remote electronic device configured to receive an alert signal from the control module.

8. A method of monitoring environmental conditions in an environment, comprising:

locating a first sensor on an enclosed vehicle, the first sensor being externally mounted on the vehicle and configured to take data from the environment;

communicating a sensor signal from the first sensor to a control module integrated within the vehicle, the sensor signal being a representation of levels of a harmful substance in the environment adjacent the outside of the vehicle;

processing the sensor signal within the control module and comparing it to stored acceptable levels;

providing a notification to a worker within the vehicle as to the level of the harmful substance in the environment; and electronically linking a secondary sensor to the control module, the secondary sensor being worn by a worker, the secondary sensor being mobile to the vehicle, the control module configured to receive a second sensor signal from the secondary sensor and generate a second notification to the worker, the first sensor, second sensor and the control unit being within the environment; and permitting regulation of the control module and the first and second sensors through a user interface located in each of the control module and the first and second sensors.

9. The method of claim 8, wherein the notification indicates the presence of unacceptable levels of the harmful substance in the environment adjacent the vehicle.

10. The method of claim 8, wherein the notification indicates the presence of acceptable levels of the harmful substance in the environment.

11. The method of claim 8, wherein the second notification is broadcast through the secondary sensor.

12. The method of claim 8, wherein the second notification notifies the worker with the secondary sensor about the levels of the harmful substance in the environment adjacent the worker.

13. The method of claim 8, wherein the second notification indicates the presence of unacceptable levels of the harmful substance in the environment adjacent the worker.

14. The method of claim 8, wherein the second notification indicates the presence of acceptable levels of the harmful substance in the environment.

15. The method of claim 8, further comprising:

transmitting an alert signal to a remote location when unacceptable levels of the harmful substance are detected.

* * * * *